May 5, 1936.                F. H. OWENS                2,039,830
                          HOLDER FOR EDIBLES
                         Filed July 31, 1934           2 Sheets-Sheet 2
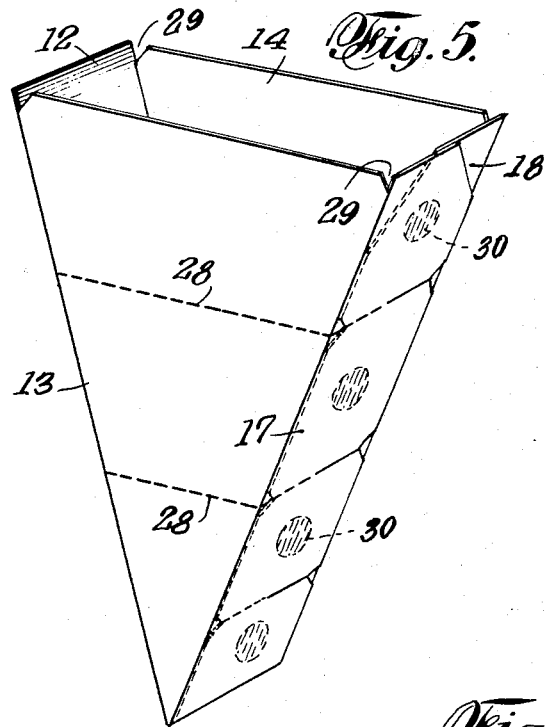
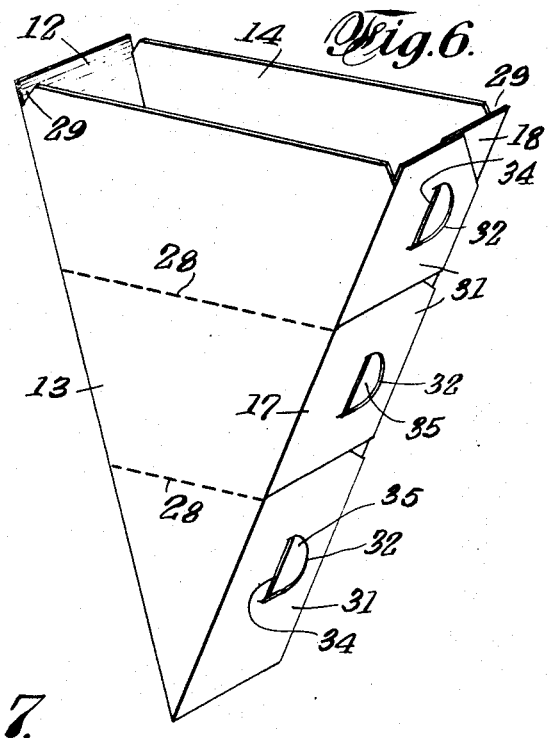
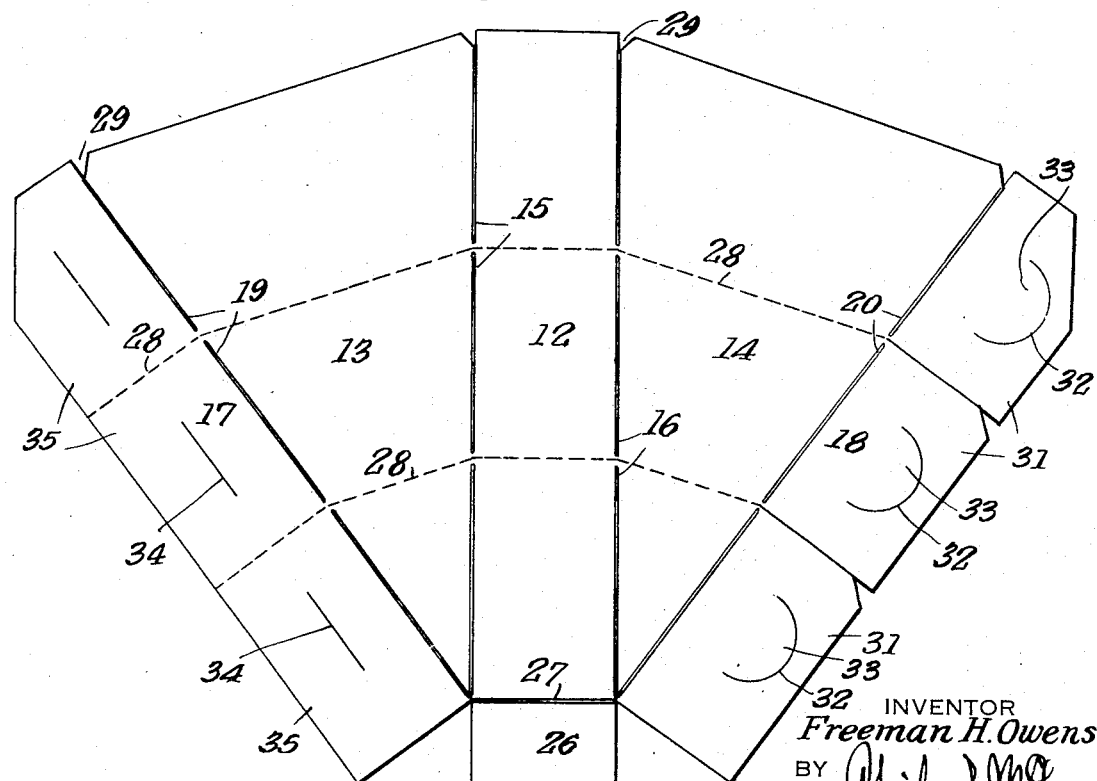
INVENTOR
Freeman H. Owens
BY
ATTORNEY Patented May 5, 1936

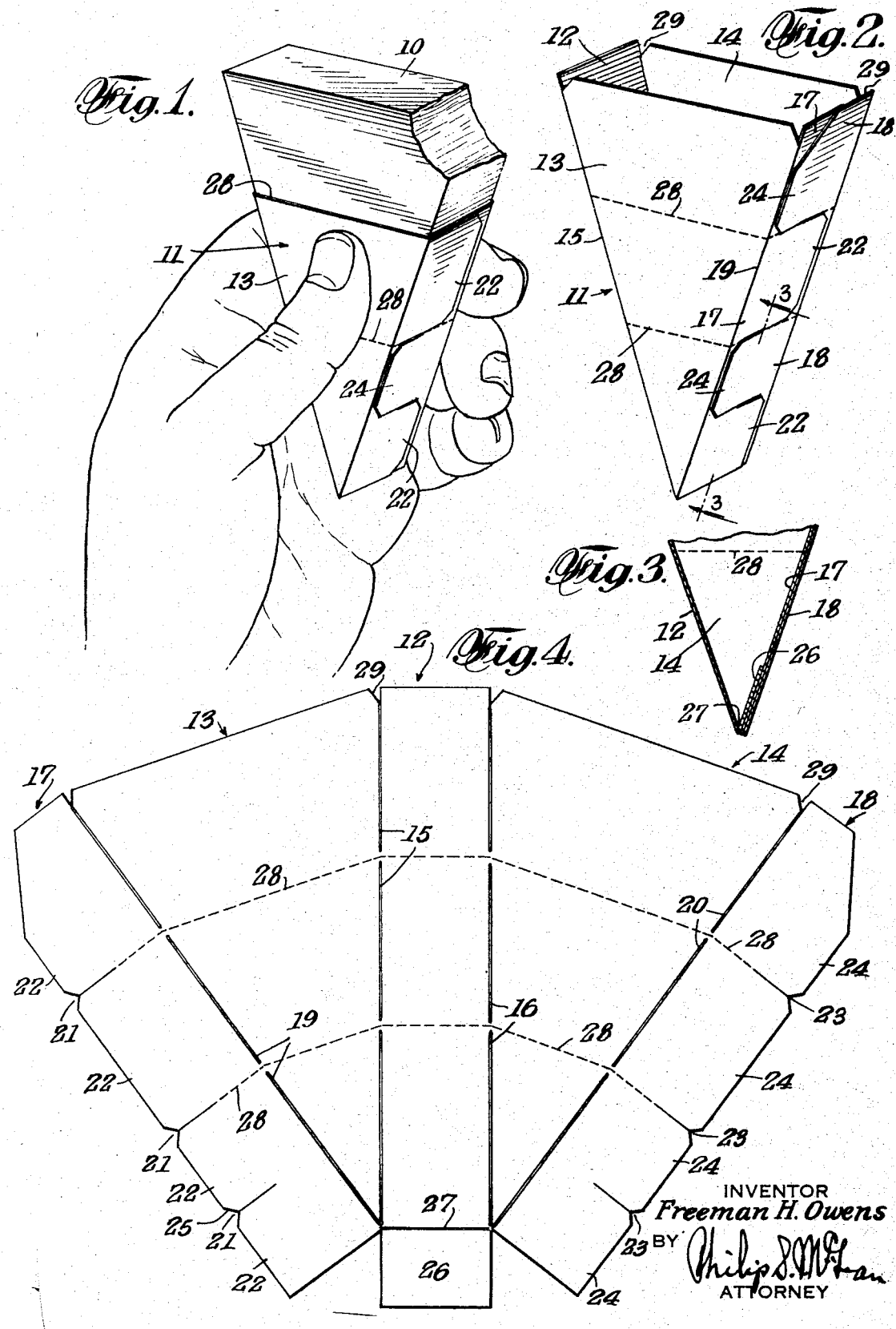

2,039,830

UNITED STATES PATENT OFFICE 2,039,830

HOLDER FOR EDIBLES

Freeman H. Owens, New York, N. Y.

Application July 31, 1934, Serial No. 737,697

6 Claims. (Cl. 229—51)

This invention relates to edibles generally but more particularly to frozen confections.

Special objects of the invention are to provide an edible in an attractive conveniently handled form, which will be entirely sanitary and can be conveniently eaten without contaminating the same and without soiling the hands or clothing.

The various novel features of the invention by which the foregoing and other desirable objects are attained are set forth in the following specification, illustrated in the accompanying drawings and broadly covered in the claims.

The drawings show by way of illustration a number of many possible embodiments of the invention and it will be appreciated as the invention is understood that many other modifications and changes may be made all within the true spirit and broad scope of the invention.

Fig. 1 is a perspective view illustrating one practical commercial embodiment of the invention as in use.

Fig. 2 is a perspective view of the paper or cardboard holder for the confection or edible material.

Fig. 3 is an enlarged broken sectional detail as on substantially the plane of line 3—3 of Fig. 2.

Fig. 4 is a plan of the blank from which the holder of Fig. 2 is made.

Figs. 5 and 6 are perspective views of other forms of the holder.

Fig. 7 is a plan of the blank from which the Fig. 6 form of holder is made.

As shown in Fig. 1, the complete article is a triangular prism 10, of frozen confection or other edible in a correspondingly shaped holder 11, and which as appears in Fig. 2, is fully open at the larger base end of the prism to expose the larger base portion of the edible, while affording a convenient tapering grip for the fingers.

This particular form of the holder is made from a flat foldable blank, which as shown in Fig. 4, consists in general of a central or intermediate panel 12, having convergently disposed triangular panels 13, 14, joined by folding lines 15, 16, to the opposite edges of the same and the extensions 17, 18, joined by the folding lines 19, 20, to the free edges of the triangular panels.

The edge panels or extensions 17, 18, are cooperable to form the fourth or last side of the box opposite that formed by the intermediate panel 12. These extensions may be made to cooperate in various ways. In this particular illustration, the extension 17, at one edge is slitted at 21, to form tongues 22, and the opposite edge extension is slitted at 23, to form separated tongues 24. When folded along the lines 15, 16, 18, 19, the tongues 22 and 24 come into overlapping relation and they are then overlapped or interlaced alternately to the inside and the outside as shown in Fig. 2, to interlock and secure the box in the set-up condition. The entrances to the slits 21 and 23 may be widened by tapered cuts indicated at 25, to facilitate this interleaving and overlapping relation of the several tabs.

To overcome the possibility of leakage, the intermediate panel 12 is shown equipped with a sealing tab 26, foldable up into the point of the box on line 27, where as indicated in Fig. 3, it is held confined by the three other sides of the box.

In addition to their interlocking securing function, the tabs 22 and 24 also serve as finger holds for tearing away the sides of the box as the material is consumed. This action is made practical by extending lines of weakness 28, inwardly from the slits 21 and 23, continuously about the sides of the box. These lines, which may be made by scoring or partially perforating the material, establish or define strips of cover material which may be torn off to expose the unconsumed side portions of the edible material.

In Fig. 1, the article is shown as it appears with the top or base strip section torn away along the upper line 28. In this condition, the smaller tapered portion of the holder serves as a convenient grip and the larger base portion of the comestible is fully exposed all the way around, so that it may be conveniently and neatly eaten. In such relation, the base corners may first be taken off after the manner indicated to avoid any possibility of drip. The flat character of the triangular prism facilitates this operation, the prism usually being made only thick enough to be easily taken in the bite of the teeth.

As the material is eaten down to the first tear line, the second tear strip may then be taken off on the next tear line 28. In the first instance, the tab 24, from one side was used to initiate the tear and in the next instance, the alternate reversely faced tab 22, from the opposite side of the box is used to tear the second strip away in the reverse direction. One or more additional tearing lines may be provided or in the smaller sizes it may be desirable to have only a single tearing line and to take away only the upper portion of the container.

The shape of the package also is advantageous in affording sufficient grip in the one hand, while tearing away the removable section by means of the other hand, the flat character of the package preventing it turning in the hand while this operation is going on.

The material of the holder may be cardboard, wax paper, or the like. Preferably, and usually it is durable and firm enough to hold its shape without further assistance, while the material is being placed therein.

In a practical example, for frozen confection the holders are set up and placed in a V-shaped trough flat against each other in a continuous row and the "mix" partly frozen, is poured in this continuous row of flat abutting holders, a scraper operating across the open tops of the containers removes any surplus material and the filled group in a compact mass are then put in the freezer and the edible material hard frozen. After this operation, the material and holder become a unit and may be handled as such. If desired, suitable covers may be placed over the open ends of the holders, for shipment, serving, advertising or other purposes.

To accurately position all the holders in a row in a filling machine, the edges of the holders may be notched as indicated at 29, Figs. 2 and 4, on the fold lines 15, 16, 19, 20, to receive the edges of the hopper which delivers the "mix" into the row of holders.

Instead of securing the meeting edges by interlocking tabs, the overlapping parts may be secured together by "spotting" the tabs with suitable cement or adhesive as indicated at 30, Fig. 5.

Various modifications of interlocking may be employed. Thus as shown in Figs. 6 and 7, there may be separated tabs or extensions 31, at one edge of the blank with half-moon or other shaped cuts 32, therein, defining bendable tongues 33, insertable through the slots 34, in the foldable extension 35, at the opposite edge of the blank.

While the simple forms are preferred because of the matter of expense, more complicated, different shapes may be made up and sticks or other holding means be projected from the bottom of the box. In one example, the holder may be made up in parallelepiped form with the intermediate and side panels joined on parallel folding lines and the overlapping extensions at the edges similarly hinged on parallel folding lines.

The paper or cardboard container with the tear off section or sections serves as an eminently practical holder for the frozen edible, as that part of the frozen material remaining in the bottom of the holder is insulated from the heat of the fingers by the cardboard and the part which is exposed by the tearing away of the upper strip or strips is softened by the higher temperature, suitable for eating. This heat insulating quality of the holders is an aid to shipment and makes the articles last longer. The cuts defining the finger tabs may be simply slits, or notches or combinations of both slits and notches. The notches afford convenience in setting up the boxes and in separating the tabs so that they may be readily grasped, the slits provide shear lines for starting the tearing.

To insure continuous easy tearing, uninterrupted by the scoring or fold lines 15, 16, 19, 20, the tearing lines 28, may be run continuously about all four sides of the box, Figs. 2 and 4, and the scoring or bending lines be interrupted at opposite sides of the tear lines. This has the effect of preventing a tear which has been started from straying off into one of the score lines and also prevents the tear strips from breaking off at the fold corners.

The material of the holder may be transparent or translucent to show the contents and may be colored or not to accord or contrast with the contents. The edible contents may be all one kind or may be different kinds, levelled off at the tearing lines so as to give a new effect as each strip is torn away.

What is claimed is:

1. A holder for frozen confection and the like, comprising a box in the form of a triangular prism open at the base end of such prism and having a line of weakness about the several sides of the same defining a removable tearing strip, said box having an additional line of weakness extending about the sides of the same at a distance from the first line of weakness and defining a second tearing strip, each of said tearing strips having a free finger tab for starting the tearing removal of the same, said tabs being interlaced in opposite directions.

2. A box blank, comprising an intermediate panel, triangular panels joined on folding lines to opposite edge portions of said intermediate panel, extensions joined on folding lines to the free edges of said triangular panels and cooperable to form a panel opposite the intermediate panel aforesaid, said extensions being slitted to interlace when brought together opposite the intermediate panel and the blank having lines of weakness extending across the several panels from the slits to form tearing strips.

3. A box blank, comprising an intermediate panel, triangular panels joined on folding lines to opposite edge portions of said intermediate panel, extensions joined on folding lines to the free edges of said triangular panels and cooperable to form a panel opposite the intermediate panel aforesaid, said extensions being slitted to interlace when brought together opposite the intermediate panel, the blank having lines of weakness extending across the several panels from the slits to form tearing strips, said lines of weakness extending continuously across the folding lines and the folding lines terminating at opposite sides of the lines of weakness to facilitate tearing in continuous strips.

4. A blank for a foldable confection holder, comprising an intermediate and side panels joined on folding lines and said side panels having extensions joined on folding lines and cooperable to form a companion panel opposite the intermediate panel, said panels and extensions having lines of weakness extending thereacross to establish a continuous tearing strip or strips and said extensions being slitted inwardly from the opposing edges of the same in register with said lines of weakness to provide opposed tabs for oppositely interlacing engagement to hold the blank in folded form and free finger tabs for starting the tearing action.

5. A holder for confections and the like, comprising a box of tearable material having opposing edges slitted inwardly to form separated tongues, said tongues being interlaced in opposite directions to the inside and to the outside of the box to thereby form an adjustable slip joint holding the box edges together and to provide loose finger tabs for tearing away the box in strips and said box material having lines of weakness extending inwardly from said slits for enabling the tearing started at said slits being continued on around the box.

6. A holder for edibles, comprising tearable material to be folded into container shape and having opposing edges slitted inwardly to form separated opposing tongues to interlace in opposite directions to the inside and to the outside of the folded container and thereby to form an adjustable slip joint for holding the edges together and to provide loose finger tabs for the tearing away in strips of the container forming material, said material having lines of weakness extending inwardly from the tongue defining slits for enabling tearing started in the slits at one edge being continued across the material into the slits at the opposite edge and said material further having fold lines angularly related to said lines of weakness, said fold lines extending approximately to but not crossing said lines of weakness, whereby tearing started on said lines of weakness will continue past said fold lines.

FREEMAN H. OWENS.